United States Patent [19]
Young

[11] Patent Number: 5,953,958
[45] Date of Patent: Sep. 21, 1999

[54] RAM DRIVE FOR A CYLINDRICAL DRUM

[75] Inventor: Richard Nils Young, Atlanta, Ga.

[73] Assignee: DBS Manufacturing, Inc., Forest Park, Ga.

[21] Appl. No.: 08/764,973

[22] Filed: Dec. 13, 1996

[51] Int. Cl.$^6$ ................................................ F16H 27/02
[52] U.S. Cl. .............................. 74/129; 74/128; 74/89.15
[58] Field of Search ......................... 74/129, 128, 89.15, 74/154, 152; 474/84

[56] References Cited

U.S. PATENT DOCUMENTS

| | | | |
|---|---|---|---|
| 2,874,544 | 2/1959 | Switzer | 74/129 |
| 2,947,187 | 8/1960 | Graff et al. | 74/128 X |
| 3,455,176 | 7/1969 | Dunn et al. | 74/129 |
| 3,515,009 | 6/1970 | Matusch et al. | 74/128 |
| 3,915,064 | 10/1975 | Dancs . | |
| 4,250,761 | 2/1981 | Lodge | 74/128 X |
| 4,281,588 | 8/1981 | Jaske . | |
| 5,009,115 | 4/1991 | Ringot et al. | 74/89.15 |
| 5,182,977 | 2/1993 | Gulbrantson . | |
| 5,447,106 | 9/1995 | Baird | 74/128 X |

*Primary Examiner*—John A. Jeffery
*Assistant Examiner*—Marcus Charles

*Attorney, Agent, or Firm*—Needle & Rosenberg, P.C.

[57] ABSTRACT

An apparatus for rotating a drum employs a plurality of drive sprockets disposed about the outside surface of the drum and spaced-apart along the length of the drum. Each drive sprocket has a first flange, a second flange, and a plurality of pins interconnecting the first flange and the second flange, spaced-apart about the drum and parallel to the axis of the drum. Spaced-apart hydraulic rams each exert force on one of the drive sprockets so as to cause rotation of the drum. Each ram is moveable between a linearly retracted first state and a linearly extended second state and has a first end and an opposite second end. The first end is secured to the base, the second end is engageable with the pins of a selected drive sprocket so that as the ram extends from the first state to the second state, the ram exerts force on a pin in the first direction, the first direction being tangential to the outside surface and perpendicular to the axis of the drum. Force from the rams is transferred to the drum through the pins, the first flange and the second flange. A plurality of spaced-apart ratchet stops prevent movement of the drum in a direction opposite the first direction. Torque applied to the drum by the rams is distributed along the length of the drum at each of the plurality of drive sprockets.

17 Claims, 4 Drawing Sheets

RAM DRIVE FOR A CYLINDRICAL DRUM

BACKGROUND OF THE INVENTION

1. Field of the Invention

This invention relates to a method and apparatus for rotating a cylindrical drum. More particularly, this invention relates to rotating a cylindrical drum using a plurality of hydraulic ram drives.

2. The Prior Art

Ram drives for translating lateral motion to rotational motion are known for use in slowly rotating objects. For example, U.S. Pat. No. 3,915,064, issued to Dancs, the specification for which is incorporated herein by reference, shows a fluid drive device for high torque, low speed applications. Such drives have the advantage of using inexpensive off-the-shelf hydraulic rams to provide motive force to rotatable objects.

Ram drives in the prior art, however, have a disadvantage in that they concentrate a high degree of torque at one location, usually close to an axle used to rotate the drum. If the torque is concentrated at an axle, the axle and the connection of the axle to the drum must be constructed of a material that not only can withstand the loading of the drum on the axle, but that can withstand the high amount of torque applied to the axle. Furthermore, the drum itself must be constructed of materials that will withstand and distribute the torque imparted onto the drum by the drive. Such materials add considerable cost to the drum.

SUMMARY OF THE INVENTION

The above-noted disadvantages of the prior art are overcome by the present invention, which in one aspect is an apparatus for rotating a drum having an axis and an outside surface and rotatably mounted on a base. A plurality of drive sprockets are disposed about the outside surface of the drum and spaced-apart along the length of the drum. A drive exerts force on each of the drive sprockets so as to cause rotation of the drum about the axis in a first direction. Torque applied to the drum is distributed along the length of the drum at each of the plurality of drive sprockets.

In another aspect of the invention, each drive sprocket has a first flange circumferentially disposed about and coupled to the outside surface of the drum; a second flange, circumferentially disposed about and coupled to the outside surface of the drum, spaced apart from and parallel to the first flange; and a plurality of pins interconnecting the first flange and the second flange, spaced-apart about the drum, the pins being disposed parallel to the axis of the drum. A plurality of spaced-apart hydraulic rams exert force on each of the drive sprockets so as to cause rotation of the drum about the axis in a first direction. Each ram is moveable between a linearly retracted first state and a linearly extended second state and has a first end and an opposite second end. The first end is secured to the base. The second end is engageable with the pins of a selected drive sprocket so that as the ram extends from the first state to the second state the ram exerts force on a pin in the first direction, the first direction being substantially tangential to the outside surface and perpendicular to the axis of the drum. Force is transferred from the rams to the drum through the pins, the first flange and the second flange. A programmable logic device controls the hydraulic rams so as to apply force to each drive sprocket in a predetermined manner.

A plurality of spaced-apart ratchet stops prevent movement of the drum in a direction opposite the first direction. Each ratchet stop has a proximal end secured to the base and a distal end engageable with a pin of the drive sprocket to provide counter-force to the pin in the first direction if the drum tends to rotate in the direction opposite the first direction.

Yet another aspect of the invention is a method of rotating a drum having an axis and an outside surface and rotatably mounted on a base. Rotational force is exerted on the outer surface of the drum at a plurality of locations spaced-apart at predetermined intervals along the length of the drum so as to rotate the drum about the axis in a first direction while distributing torque applied to the drum along the length of the drum at a plurality preselected locations. Movement of the drum in a direction opposite the first direction is prevented, thereby ensuring that the drum moves in one direction.

An advantage of the invention is that it imparts torque directly onto the outer surface of the drum, rather than imparting it near an axis of the drum.

A further advantage of the invention is that it distributes torque along the length of the drum, rather than concentrating it at a single location. Therefore, the drum can be constructed from less expensive material than drums employing rotational drives of the prior art.

A further advantage of the invention is that it rotates a drum using inexpensive components.

These and other advantages will become apparent from the following description of the preferred embodiment taken in conjunction with the following drawings, although variations and modifications may be effected without departing from the spirit and scope of the novel concepts of the disclosure.

DETAILED DESCRIPTION OF THE INVENTION

Figure 1:
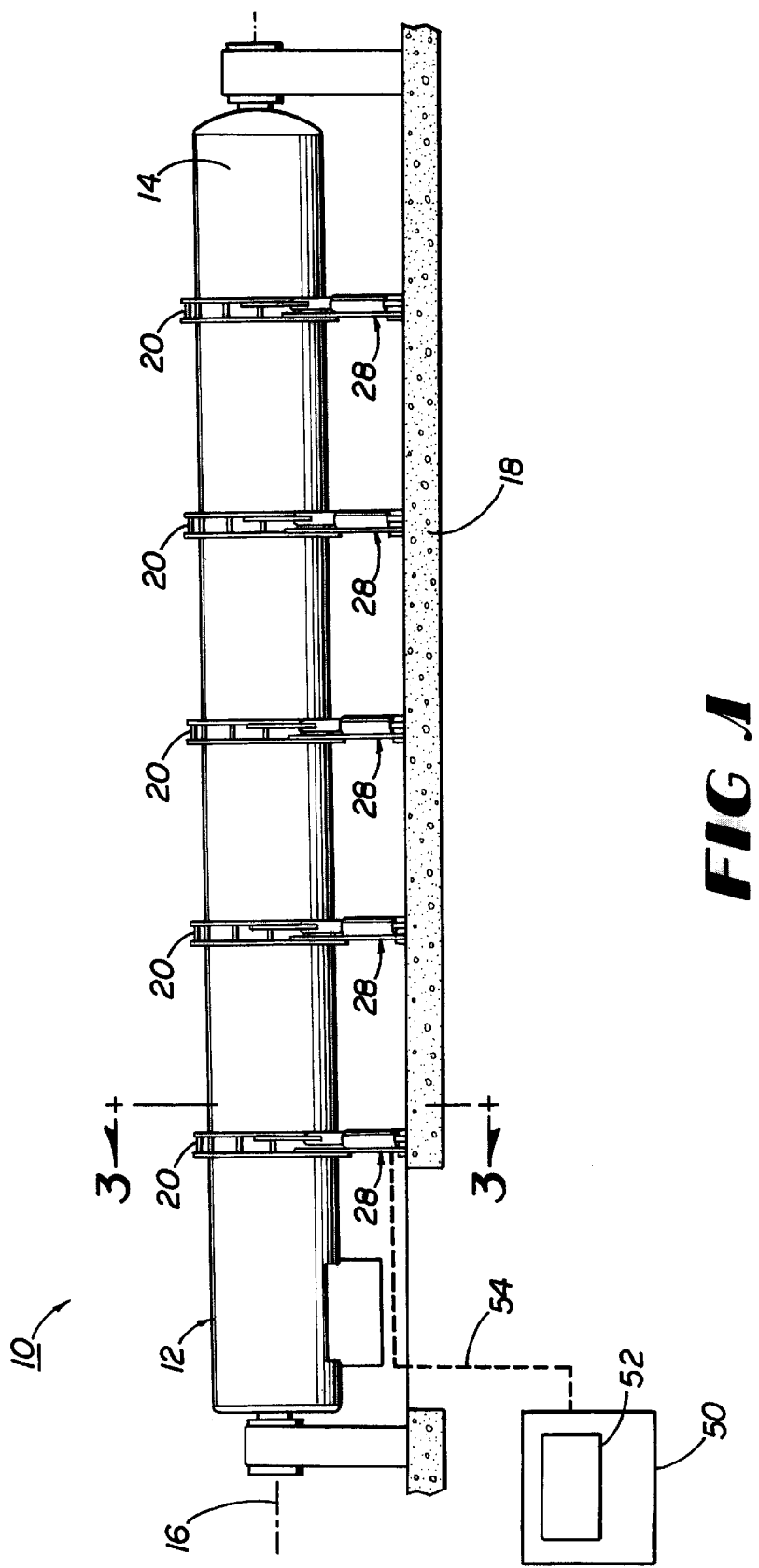
FIG. 1 is a front elevational view of one embodiment of the invention.

A preferred embodiment of the invention is now described in detail. Referring to the drawings, like numbers indicate like parts throughout the views. As used in the description herein and throughout the claims that follow, "a," "an," and "the" includes plural reference unless the context clearly dictates otherwise. Also, as used in the description herein and throughout the claims that follow, the meaning of "in" includes "in" and "on" unless the context clearly dictates otherwise.

Figure 2:
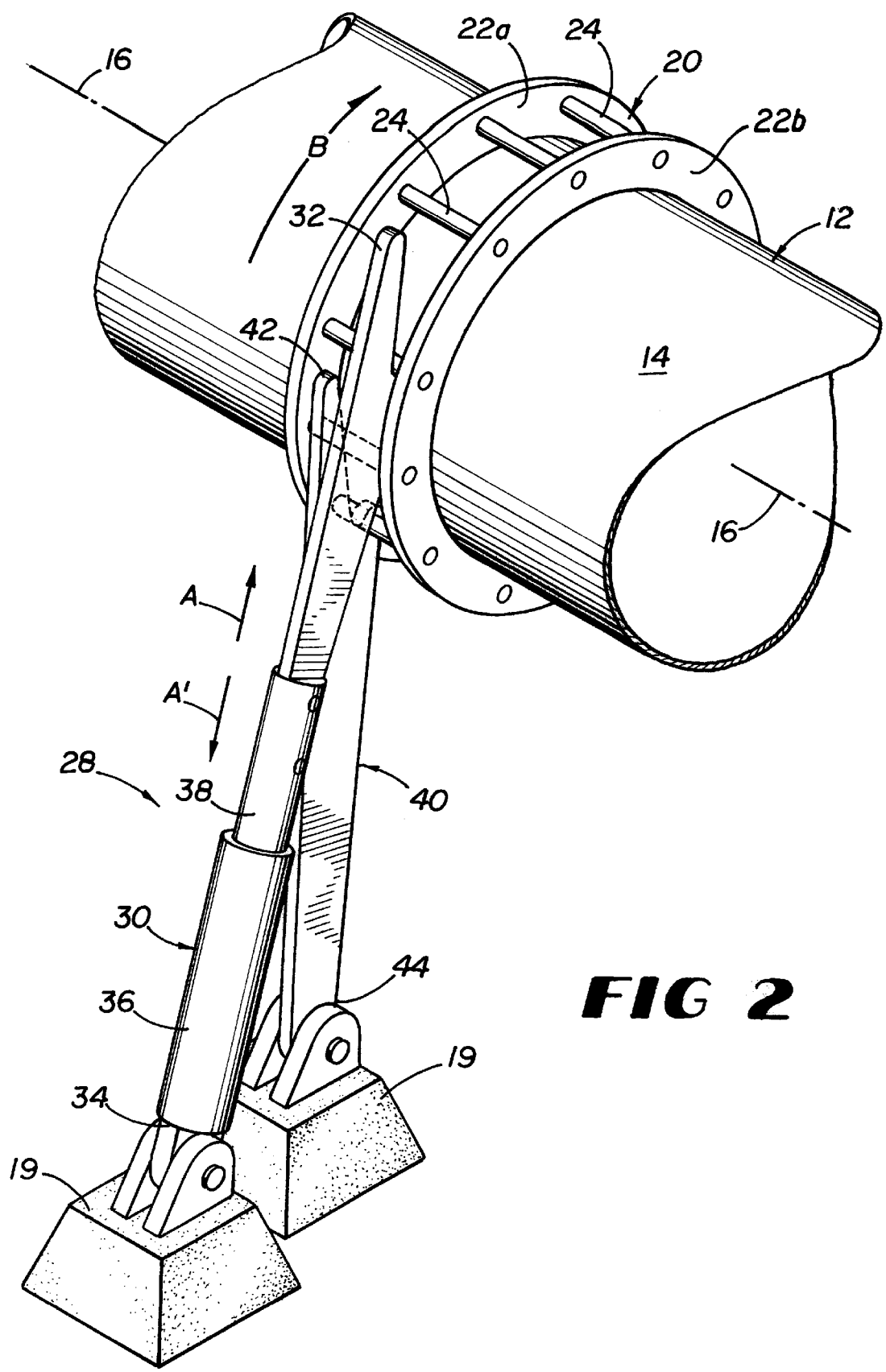
FIG. 2 is a perspective view of one ram drive and one drive sprocket in accordance with the invention.
Figure 3:
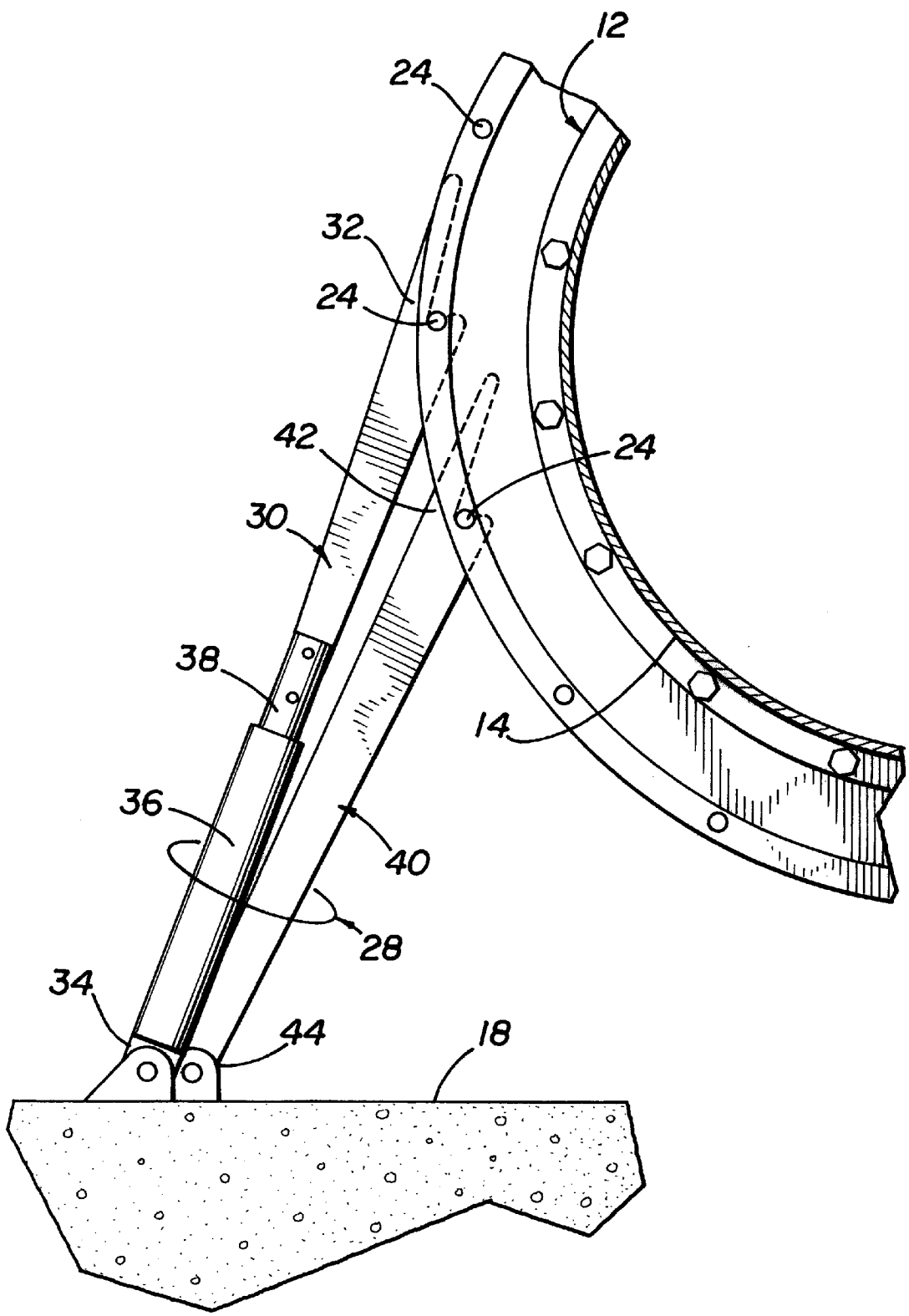
FIG. 3 is a partial cross-sectional view of a force exerting means in accordance with the invention taken along line 3—3 in FIG. 1.

One embodiment of the invention, as shown in FIGS. 1–3, is an apparatus 10 for rotating a drum 12 having an axis 16 and an outside surface 14 that is rotatably mounted on a base 18. A plurality of drive sprockets 20 are disposed about the outside surface 14 of the drum 12 and are spaced-apart along its length. As best seen in FIG. 2, a drive unit 28 is provided for exerting force on each of the drive sprockets 20 so as to cause rotation of the drum about the axis 16 in a first direction B. Torque applied to the drum 12 by the drive units 28 is distributed along the length of the drum 12 at each of the plurality of drive sprockets 20.

Still referring to FIG. 2, each drive sprocket 20 comprises a first flange 22a circumferentially disposed about and coupled to the outside surface 14 of the drum 12. A second flange 22b is also circumferentially disposed about and coupled to the outside surface 14 of the drum 12 so that it is spaced apart from and parallel to the first flange 22a. A plurality of pins 24 interconnect the first flange 22a and the second flange 22b. The pins 24 are spaced apart about the drum 12 and are disposed parallel to the axis 16 of the drum 12.

Each drive unit 28 comprises a ram drive 30 and a ratchet stop 40. Each ram drive 30 includes a hydraulic cylinder 36 and a piston 38 that is capable moving between a linearly retracted first state and a linearly extended second state, moving in directions A and A'. Each ram has a first end 34 secured to the base 18 (additional supports 19 may be used to facilitate positioning the ram drive 30) and an opposite second end 32 engageable with the pins 24 of a selected drive sprocket 20. As the ram 30 extends from the first state to the second state, the ram contacts and then exerts force on a pin 24 in direction A, which is substantially tangential to the outside surface 14 and perpendicular to the axis 16 of the drum 12. Thus, force from each of the rams 30 is transferred to the drum 12 through the pins 24, the first flange 22a and the second flange 22b.

The ratchet stops 40 prevent movement of the drum 12 in a direction opposite the direction of rotation (direction B). Each ratchet stop 40 has a proximal end 44 secured to the base 18 and a distal end 42. The distal end 42 is engageable with a pin 24 of the drive sprocket 20 to provide a counter force to the pin 42 in direction B if the drum tends to rotate opposite direction B.

Referring to FIG. 1, a hydraulic control unit 50, of the type known in the art of hydraulic systems, controls the motion of the drive units 28 so that they act in concert. The control unit 50 could be of the type that employs a programmable logic device 52 to generate control signals 54 to the drive units 28 so that they apply force in a predetermined manner. (An example of a suitable logic device is a FXO-20MR-ES Programmable Logic Controller from Mitsubishi. Programming code for this controller is attached hereto as Appendix A.) If the hydraulic rams drives 30 are driven by a single hydraulic pump (not shown) then timing of the hydraulic rams drives 30 is not critical. This is because if one ram drive 30 leads the others during an extension, as soon as the leading ram engages a drive sprocket 20 increased pressure in the cylinder 36 will cause hydraulic fluid in the system to be diverted into the other rams drives 30. In this way, substantial force will not be exerted on any of the drive sprockets 20 until each ram drive 30 has engaged its respective drive sprocket 20.

Although hydraulic ram drives 30 are disclosed herein as providing the motive force in the drive units 28, it will be readily appreciated that several alternative types of ram drives 30 could be used without departing from the scope of the invention. Such drive units comprise screw jacks and other drive units, as would be known to one skilled in the art of mechanical design.

Figure 4:
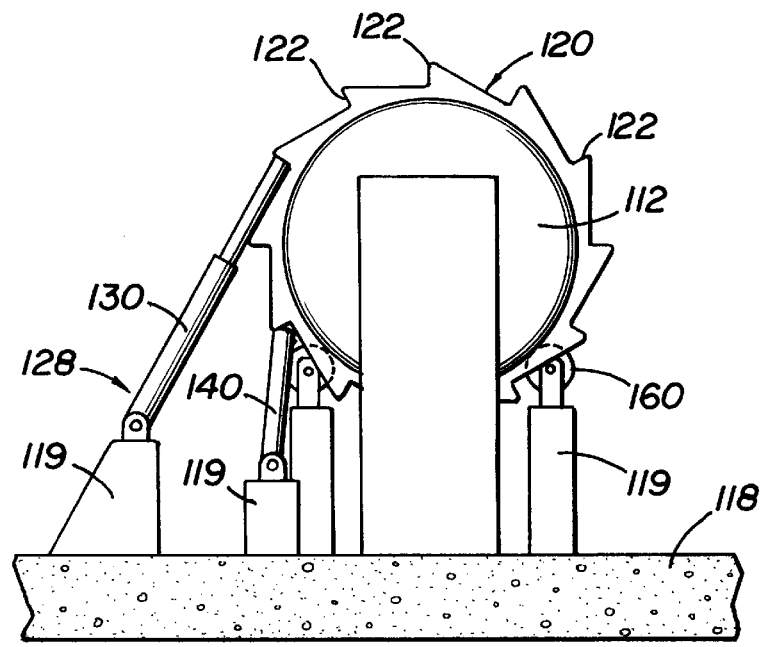
FIG. 4 is an alternative embodiment of a drive and drive sprocket in accordance with the invention.

As shown in FIG. 4, an alternative embodiment employs a drive sprocket 120 comprising a plurality of scalloped cogs 122 disposed around the drum 112. The drive unit 128, which may comprise a hydraulic ram 130 and a ratchet stop 140, fits against the cogs 122 to exert force on the cogs 122 of the drive sprocket 120. The drive unit 128 may be affixed to a base 118 or to support units 119 to facilitate positioning of the drive unit 128. Also, the drum 112 may be further supported by a plurality of support wheels 160.

Figure 5:
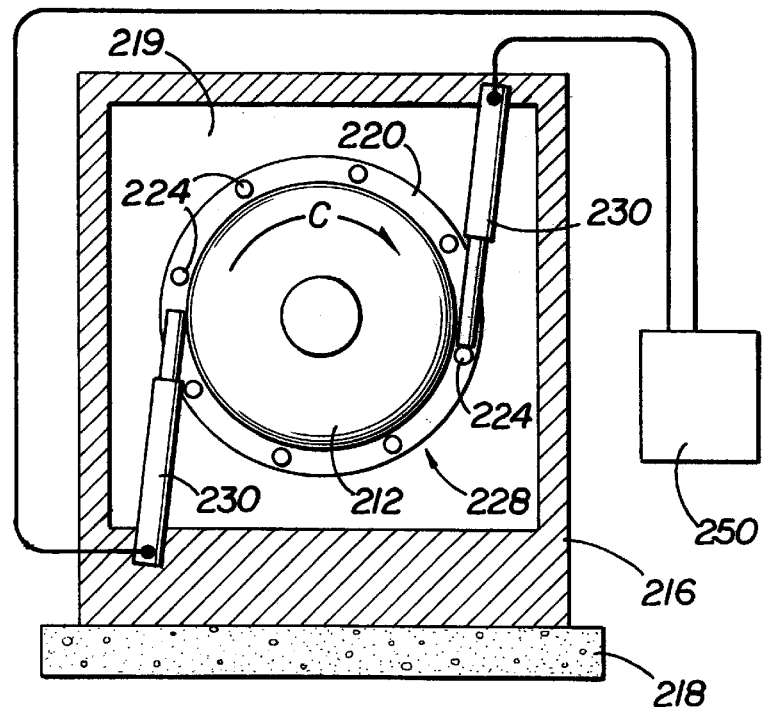
FIG. 5 is a cross-sectional view of an embodiment of the invention that allows for continuous rotation of the drum.

As shown in FIG. 5, continuous rotation of the drum 212 can be accomplished using an embodiment wherein each drive unit 228 includes at least two ram drives 230 acting in concert. This embodiment employs a frame 216 defining an opening 219 therethrough. The frame 216 is secured to the base 218 and is disposed so that the drum 212 extends through the opening 219. A plurality of spaced-apart drive units 230 are secured to the frame 216. The drive units 230 engage the pins 224 of the drive sprocket 220 causing the drum 212 to rotate in direction C. A control unit 250 controls each of the rams 230 so that at least two of the rams 230 secured to one frame 216 extend at different times, thereby facilitating continuous rotation of the drum 212.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

APPENDIX

```
     !M8012                                                             K5   !
  0  +-I I----------------------------------------------------------------(C0  )+
     !                                                                       !
     !                                                                       !
     !                                                                       !
     !M8012                                                            K15   !
  4  +-I I----------------------------------------------------------------(C1  )+
     !                                                                       !
     !                                                                       !
     !                                                                       !
     !C0                                                                 K5  !
  8  +-I I----------------------------------------------------------------(T0  )+
     !                                                                       !
     !                                                                       !
     !                                                                       !
     !M21                                                              K100  !
 12  +-I I----------------------------------------------------------------(T1  )+
     !                                                                       !
     !                                                                       !
     !                                                                       !
     !M21                                                              K200  !
 16  +-I I----------------------------------------------------------------(T2  )+
     !                                                                       !
     !                                                                       !
     !                                                                       !
     !M1                                                               K100  !
 20  +-I I----------------------------------------------------------------(T3  )+
     !                                                                       !
     !                                                                       !
     !                                                                       !
     !M1                                                                K50  !
 24  +-I I----------------------------------------------------------------(T4  )+
     !                                                                       !
     !                                                                       !
     !                                                                       !
     !Y2   M12                                                          K50  !
 28  +-I I---I I------------------------------------------------------------(T5  )+
     !                                                                       !
     !                                                                       !
     !                                                                       !
```

APPENDIX

```
    !M5    M12                                                  K20  !
 33 +-I I-+-I I----------------------------------------------(T6  )+
    !     !                                                        !
    !     !                                                        !
    !     !                                                        !
    !M20  !                                                        !
    +-I I-+                                                        +
    !     !                                                        !
    !     !                                                        !
    !     !                                                        !
    !T7   !                                                        !
    +-I I-+                                                        +
    !     !                                                        !
    !     !                                                        !
    !     !                                                        !
    !T8   !                                                        !
    +-I I-+                                                        +
    !                                                              !
    !                                                              !
    !                                                              !
    !
    !M498  M12                                                 K200 !
 41 +-I/I---I I---------------------------------------------(T7  )+
    !                                                              !
    !                                                              !
    !                                                              !
    !M498  M12                                                 K200 !
 46 +-I I---I I---------------------------------------------(T8  )+
    !                                                              !
    !                                                              !
    !                                                              !
    !M0                                                        K10  !
 51 +-I I---------------------------------------------------(T9  )+
    !                                                              !
    !                                                              !
    !                                                              !
    !C1                                                        K5   !
 55 +-I I---------------------------------------------------(T10 )+
    !                                                              !
    !                                                              !
    !                                                              !
    !X6   M12                                                  K50  !
 59 +-I I---I I---------------------------------------------(T12 )+
    !                                                              !
    !                                                              !
    !                                                              !
```

11

APPENDIX

```
    !X7     M12                                                         K50   !
 64 +-I I---I I-----------------------------------------------------(T11 )+
    !
    !
    !
    !X0     T9                                                                !
 69 +-I I---I/I-------------------------------------------------[SET   M0  ]+
    !
    !
    !
    !X10                                                                      !
 72 +-I I------------+------------------------------------------[RST   M0  ]+
    !               !
    !               !
    !               !
    !X11    T12     M1  !
    +-I I---I/I---I/I-+
    !
    !
    !
    !X0     X13    T9                                                         !
 78 +-I I---I/I---I/I-------------------------------------------[SET   M1  ]+
    !
    !
    !
    !T3                                                                       !
 82 +-I I-------------------------------------------------------[RST   M1  ]+
    !
    !
    !
    !T4                                                                       !
 84 +-I I-------------------------------------------------------[SET   M3  ]+
    !
    !
    !
    !T3                                                                       !
 86 +-I I-------------------------------------------------------[RST   M3  ]+
    !
    !
    !
    !T1                                                                       !
 88 +-I I-------------------------------------------------------[SET   M6  ]+
    !
    !
    !
```

12

APPENDIX

```
      !M15
 90 +-I I-+------------------------------------[RST  M6 ]+
    !     !
    !     !
    !     !
    !M23  !
    +-I I-+
    !
    !
    !
    !T2
 93 +-I I-------------------------------------[SET  M7 ]+
    !
    !
    !
    !M15
 95 +-I I-+------------------------------------[RST  M7 ]+
    !     !
    !     !
    !     !
    !M23  !
    +-I I-+
    !
    !
    !
    !M5
 98 +-I I-+-----+------------------------------[SET  M8 ]+
    !     !    !
    !     !    !
    !     !    !
    !M20  !    !
    +-I I-+    !
    !          !
    !          !
    !          !
    !T8   T12  !
    +-I I-+-I I-+
    !     !
    !     !
    !     !
    !T7   !
    +-I I-+
    !
    !
    !
```

APPENDIX

```
      !M15
   05 +-I I-+-----------------------------------------[RST  M8  ]+
      !     !
      !     !
      !     !
      !M23  !
      +-I I-+

!M6   M35
  108 +-I/I-+-I I-+-----------------------------------[SET  M9  ]+
      !     !     !
      !     !     !
      !     !     !
      !     !M36  !
      !     +-I I-+

!M40
  113 +-I I----------------------------------------- [RST  M9  ]+
      !
      !
      !
      !M7
  115 +-I I----------------------------------------- [SET  M10 ]+
      !
      !
      !
      !M40
  117 +-I I----------------------------------------- [RST  M10 ]+
      !
      !
      !
      !X0   T9
  119 +-I I---I/I----------------------------------- [SET  M12 ]+
      !
      !
      !
```

14
APPENDIX

```
     !M23
  22 +-I I-+------------------------------------------[SET  M21 ]+
     !     !                                                     !
     !     !                                                     !
     !     !                                                     !
     !M15  !                                                     !
     +-I I-+                                                     +
     !                                                           !
     !                                                           !
     !                                                           !
     !M35                                                        !
 125 +-I I-+------------------------------------------[RST  M21 ]+
     !     !                                                     !
     !     !                                                     !
     !     !                                                     !
     !M36  !                                                     !
     +-I I-+                                                     +
     !                                                           !
     !                                                           !
     !                                                           !
     !T5                                                         !
 128 +-I I---------------------------------------------[SET  M70 ]+
     !                                                            !
     !                                                            !
     !                                                            !
     !M40                                                         !
 130 +-I I---------------------------------------------[RST  M70 ]+
     !                                                            !
     !                                                            !
     !                                                            !
     !M15                                                         !
 132 +-I I---------------------------------------------[SET  M498]+
     !                                                            !
     !                                                            !
     !                                                            !
     !M23                                                         !
 134 +-I I---------------------------------------------[RST  M498]+
     !                                                            !
     !                                                            !
     !                                                            !
     !M54   M498                                                  !
 136 +-I I---I/I---------------------------------------[SET  M499]+
     !                                                            !
     !                                                            !
     !                                                            !
```

APPENDIX

```
     !M15                                                                    !
 39 +-I I---------------------------------------------------[RST   M499 ]+
     !                                                                       !
     !                                                                       !
     !                                                                       !
     !M55   M498                                                              !
141 +-I I---I/I---------------------------------------------[SET   M500 ]+
     !                                                                       !
     !                                                                       !
     !                                                                       !
     !M15                                                                    !
144 +-I I---------------------------------------------------[RST   M500 ]+
     !                                                                       !
     !                                                                       !
     !                                                                       !
     !M64   M498                                                              !
146 +-I I---I I---------------------------------------------[SET   M501 ]+
     !                                                                       !
     !                                                                       !
     !                                                                       !
     !M23                                                                    !
149 +-I I---------------------------------------------------[RST   M501 ]+
     !                                                                       !
     !                                                                       !
     !                                                                       !
     !M65   M498                                                              !
151 +-I I---I I---------------------------------------------[SET   M502 ]+
     !                                                                       !
     !                                                                       !
     !                                                                       !
     !M23                                                                    !
154 +-I I---------------------------------------------------[RST   M502 ]+
     !                                                                       !
     !                                                                       !
     !                                                                       !
     !T0                                                                     !
156 +-I I---------------------------------------------------[RST   C0   ]+
     !                                                                       !
     !                                                                       !
     !                                                                       !
     !T10                                                                    !
159 +-I I---------------------------------------------------[RST   C1   ]+
     !                                                                       !
     !                                                                       !
     !                                                                       !
```

16

APPENDIX

```
     !X5         M5
  62 +-I I-------+-I I-+-------------------------------------[PLS   M15  ]+
     !           !     !                                                  !
     !           !     !                                                  !
     !           !     !                                                  !
     !T11   T6   !     !                                                  !
     +-I I---I I-+     !                                                  +
     !                 !                                                  !
     !                 !                                                  !
     !                 !                                                  !
     !T12   T7   T6    !                                                  !
     +-I I---I I---I I-+                                                  +
     !                                                                    !
     !                                                                    !
     !                                                                    !
     !X5         M20                                                      !
 173 +-I I-------+-I I-+-------------------------------------[PLS   M23  ]+
     !           !     !                                                  !
     !           !     !                                                  !
     !           !     !                                                  !
     !T11   T6   !     !                                                  !
     +-I I---I I-+     !                                                  +
     !                 !                                                  !
     !                 !                                                  !
     !                 !                                                  !
     !T12   T8   T6    !                                                  !
     +-I I---I I---I I-+                                                  +
     !                                                                    !
     !                                                                    !
     !                                                                    !
     !M499  M500                                                          !
 184 +-I I---I I------------------------------------------- [PLS   M35  ]+
     !                                                                    !
     !                                                                    !
     !                                                                    !
     !M501  M502                                                          !
 188 +-I I---I I------------------------------------------- [PLS   M36  ]+
     !                                                                    !
     !                                                                    !
     !                                                                    !
     !X2                                                                  !
 192 +-I I--------------------------------------------------[PLF   M54  ]+
     !                                                                    !
     !                                                                    !
     !                                                                    !
```

APPENDIX

```
      !X4
  95 +-I I----------------------------------------------------[PLF  M55 ]+
      !                                                                  !
      !                                                                  !
      !                                                                  !
      !X1                                                                !
 198 +-I I----------------------------------------------------[PLF  M64 ]+
      !                                                                  !
      !                                                                  !
      !                                                                  !
      !X3                                                                !
 201 +-I I----------------------------------------------------[PLF  M65 ]+
      !                                                                  !
      !                                                                  !
      !                                                                  !
      !M499  M500   M12                                             M5   !
 204 +-I I---I I---I I--------------------------------------------( )--+
      !                                                                  !
      !                                                                  !
      !                                                                  !
      !T11                                                          M18  !
 208 +-I I--------------------------------------------------------( )--+
      !                                                                  !
      !                                                                  !
      !                                                                  !
      !M501  M502   M12                                             M20  !
 210 +-I I---I I---I I--------------------------------------------( )--+
      !                                                                  !
      !                                                                  !
      !                                                                  !
      !T11                                                               !
 214 +-I I-+---------------------------------------------------[PLF  M26 ]+
      !    !                                                             !
      !    !                                                             !
      !    !                                                             !
      !T12 !                                                             !
      +-I I-+                                                             !
      !                                                                  +
      !                                                                  !
      !                                                                  !
      !                                                                  !
```

18

APPENDIX

```
       !M54
 218 +-I I-+---------------------------------------------------.                    M40  !
       !     !                                                                  ---(   )--+
       !     !                                                                            !
       !     !                                                                            !
       !M55  !                                                                            !
       +-I I-+                                                                            !
       !     !                                                                            +
       !     !                                                                            !
       !     !                                                                            !
       !M64  !                                                                            !
       +-I I-+                                                                            !
       !     !                                                                            +
       !     !                                                                            !
       !     !                                                                            !
       !M65  !                                                                            !
       +-I I-+                                                                            !
       !                                                                                  +
       !                                                                                  !
       !                                                                                  !
       !X11   T12   M1                                                                    !
 223 +-I I---I/I---I/I-+------------------------------------------------------  M8031 !
       !                 !                                                       ---(   )--+
       !                 !                                                                 !
       !                 !                                                                 !
       !X10              !                                                                 !
       +-I I-------------+                                                                 !
       !                 !                                                                 +
       !                 !                                                                 !
       !                 !                                                                 !
       !M26              !                                                                 !
       +-I I-------------+                                                                 !
       !                                                                                   +
       !                                                                                   !
       !                                                                                   !
       !X0   X13   T9                                                                      !
 230 +-I I---I/I---I/I---------------------------------------------------------- M8032 !
       !                                                                        ---(   )--+
       !                                                                                  !
       !                                                                                  !
       !M0                                                                                !
 235 +-I I----------------------------------------------------------------------   Y0  !
       !                                                                        ---(   )--+
       !                                                                                  !
       !                                                                                  !
       !                                                                                  !
       !                                                                                  !
```

19

APPENDIX

```
     !M3          M12                                                  Y1   !
 37 +-I I--------+-I I---------------------------------------------( )--+
     !           !                                                      !
     !           !                                                      !
     !           !                                                      !
     !           !                                                      !
     !M1    M498 !                                                      !
     +-I/I---I I-+                                                      +
     !                                                                  !
     !                                                                  !
     !                                                                  !
     !M1    M8                                                     Y2   !
243 +-I/I---I I---------------------------------------------------( )--+
     !                                                                  !
     !                                                                  !
     !                                                                  !
     !M9    C0    M12                                              Y3   !
246 +-I I---I I-+-I I---------------------------------------------( )--+
     !           !                                                      !
     !           !                                                      !
     !           !                                                      !
     !M10   C1   !                                                      !
     +-I I---I I-+                                                      +
     !                                                                  !
     !                                                                  !
     !                                                                  !
     !X12   C0                                                     Y4   !
253 +-I I---I I-+-------------------------------------------------( )--+
     !           !                                                      !
     !           !                                                      !
     !           !                                                      !
     !M70   C1   !                                                      !
     +-I I---I I-+                                                      +
     !                                                                  !
     !                                                                  !
     !                                                                  !
     !Y1    Y0                                                     Y5   !
259 +-I I-+-I I---------------------------------------------------( )--+
     !     !                                                            !
     !     !                                                            !
     !     !                                                            !
     !Y2   !                                                            !
     +-I I-+                                                            +
     !                                                                  !
     !                                                                  !
     !                                                                  !
```

20
APPENDIX

```
     !Y1    Y0
 63 +-I/I-+-I I---------------------------------.                 Y6   !
     !     !                                                   --(  )--+
     !     !                                                           !
     !     !                                                           !
     !     !                                                           !
     !Y2   !                                                           !
    +-I I-+                                                            !
     !                                                                 +
     !                                                                 !
     !                                                                 !
     !                                                                 !
     !MO                                                                !
267 +-I/I-+-----------------------------------------------         Y7  !
     !     !                                                   --(  )--+
     !     !                                                           !
     !     !                                                           !
     !     !                                                           !
     !X10  !                                                           !
    +-I I-+                                                            !
     !                                                                 +
     !                                                                 !
     !                                                                 !
     !                                                                 !
 70 +--------------------------------------------------------[END ]+
     !                                                                 !
     !                                                                 !
     !                                                                 !
     !
```

APPENDIX

| name | on | set | reset | description |
|---|---|---|---|---|
| x0 | | | | motor on |
| x1 | | | | limit switch 1 |
| x2 | | | | limit switch 2 |
| x3 | | | | limit switch 3 |
| x4 | | | | limit switch 4 |
| x5 | | | | pressure sensor 5 |
| x6 | | | | backup mode when on |
| x7 | | | | noload mode when on |
| x10 | | | | motor off switch, reinitialize latches |
| x11 | | | | torque high cut off |
| x12 | | | | torque high warning |
| x13 | | | | initialization bypass on start |
| y0 | m0 | | | motor contact |
| y1 | (m498+m1)/m3+m12 | | | valve y1 |
| y2 | m8 | | | valve y2 |
| y3 | (m9+c0)/(m10+c1)+m12 | | | fast/slow indication, flashing |
| y4 | (x12+c0)/(m70+c1) | | | torque high/c slow ind, flashing |
| y5 | | | | y1 on indication |
| y6 | | | | y1 off indication, normal close |
| y7 | | x10 | x0 | cutoff indication, buzzer on |
| c0 | | | | pulse counter, fast |
| c1 | | | | pulse counter, slow |
| c2 | | | | |
| t0 | | | | pulse timer, fast |
| t1 | m21 | | | fast timer |
| t2 | m21 | | | slow timer |
| t3 | m1 | | | overall initialization time |
| t4 | m1 | | | half initialization time |
| t5 | | | | maximum time for charging the gap |
| t6 | (m5/m20/17/18)+m12 | | | normal charge timer |
| t7 | y1 off | | | backup cycle timer (when y1 off) |
| t8 | y1 on | | | backup cycle timer (when y1 on) |
| t9 | m0 | | | disable x0 timer |
| t10 | | | | pulse timer, slow |
| t11 | | x0 | x10/x11+(t12+m1)off | activation timer for noload mode |
| t12 | | x0+x13off+t9off | t3 | activation timer for backup mode |
| m0 | | | | motor contact |
| m1 | | t4 | t3 | initialization latch |
| m2 | | | | |
| m3 | | t1 | | control y1 during the initialization |
| m4 | | | | |
| m5 | m499+m500+m12 | | | on at the falling both x2 and x4 |
| m6 | | | m15/m23 | latch set by t1 |
| m7 | | | m15/m23 | latch set by t2 |

(Continued Next Page)

22

APPENDIX

| | | | |
|---|---|---|---|
| m8 | | | |
| m9 | | (m5/m20)/(t7/t8+t12) | m15/m23 | latch for y2 |
| m10 | | m35/m36+m60ff | m40 | latch y3 for fast indication |
| m11 | | m7 | m40 | latch y4 for slow indication |
| m12 | | x0 | | keep off the latchs' influence |
| m13 | | | | |
| m14 | | | | |
| m15 | (x5/(t1+t6)+m5)/(t2+t7+t6) | | | catch rising x5 |
| m17 | | | | |
| m18 | | | | |
| m19 | | | | |
| m20 | m501+m502+m12 | m15/m23 | | on at the falling edge of both x1, x3 |
| m21 | | | m35/m36 | set/reset timer t1 and t2 |
| m22 | | | | |
| m23 | (x5/(t1+t6)+m20)/(t2+t8+t6) | | | catch rising edge of x5 |
| m24 | | | | |
| m25 | | | | |
| m26 | plf(t11/t12) | | | triger m8031 |
| m30 | | | | |
| m31 | | | | |
| m35 | | m499+m500 | | pulse signal for x2, x4 both fall |
| m36 | | m501+m502 | | pulse signal for x1, x3 both fall |
| m39 | | | | |
| m40 | m54/m55/m64/m65 | | | falling pulses |
| m41 | | | | |
| m54 | | plf x2 | | catch x2 falling |
| m55 | | plf x4 | | catch x4 falling |
| m60 | | | | |
| m64 | | plf x1 | | catch x1 falling |
| m65 | | plf x3 | | catch x3 falling |
| m68 | | | | |
| m69 | | | | |
| m70 | | t5 | m40 | control y6 |
| m71 | | | | |
| m72 | | | | |
| m498 | | m15 | m23 | control y1 |
| m499 | | m54+im498 | m15 | hold x2 falling pulse |
| m500 | | m55+im498 | m15 | hold x4 falling pulse |
| m501 | | m64+m498 | m23 | hold x1 falling pulse |
| m502 | | m65+m498 | m23 | hold x3 falling pulse |
| m8012 | | | | 100 ms pulse generator |
| m8031 | x0+x13off | x10/x11/m26 | | reset no-latched memories |
| m8032 | | | | clear latched memories |

What is claimed is:

1. An apparatus for rotating a drum having an axis and an outside surface and rotatably mounted on a base, comprising:
   a. a plurality of drive sprockets disposed about the outside surface of the drum and evenly spaced-apart along the entire length of the drum; and
   b. means for exerting force on each of the drive sprockets so as to cause rotation of the drum about the axis in a first direction,
   so that torque applied to the drum by the force exerting means is distributed along the length of the drum at each of the plurality of drive sprockets.

2. The apparatus of claim 1, wherein each said drive sprocket comprises:
   a. a first flange circumferentially disposed about and coupled to the outside surface of the drum;
   b. a second flange, circumferentially disposed about and coupled to the outside surface of the drum, spaced apart from and parallel to the first flange; and
   c. a plurality of pins interconnecting the first flange and the second flange, spaced-apart about the drum, the pins being disposed parallel to the axis of the drum, so that the pins transfer force from the force exerting means to the drum through the first flange and the second flange.

3. The apparatus of claim 1, wherein said force exerting means comprises means for exerting force on the drive sprockets in a direction tangential to the outside surface and substantially perpendicular to the axis of the drum.

4. The apparatus of claim 1, wherein said force exerting means comprises a plurality of spaced-apart rams, each ram being moveable between a linearly retracted first state and a linearly extended second state, each ram also having a first end and an opposite second end, the first end being secured to the base, the second end being engageable with the drive sprocket so that as the ram extends from the first state to the second state the ram exerts force on the drive sprocket in the first direction.

5. The apparatus of claim 4, further comprising means for controlling said force exerting means so as to apply force to each drive sprocket in a predetermined manner.

6. The apparatus of claim 5, wherein said controlling means comprises:
   a. a programmable logic device, programmed to generate a plurality of control signals; and
   b. means for converting each of the control signals into an actuation signal for at least one of the rams.

7. The apparatus of claim 4 wherein each said ram comprises a hydraulic ram.

8. The apparatus of claim 1, wherein said force exerting means comprises a plurality of force exerting units spaced apart along the length of the drum, each force exerting unit comprising:
   a. a frame defining an opening therethrough, disposed so that the drum extends through the opening;
   b. a plurality of spaced-apart rams, each ram being moveable between a linearly retracted first state and a linearly extended second state, each ram also having a first end and an opposite second end, the first end being secured to the frame, the second end being engageable with the drive sprocket so that as the ram extends from the first state to the second state the ram exerts force on the drive sprocket in the first direction;
   c. means for controlling each of the rams so that at least two of the rams secured to one frame extend from the first state to the second state at different times, thereby facilitating continuous rotation of the drum.

9. The apparatus of claim 8, further comprising means for controlling the force exerting means so as to apply force to each drive sprocket in a predetermined manner.

10. The apparatus of claim 9, wherein the controlling means comprises:
    a. a programmable logic device, programmed to generate a plurality of control signals; and
    b. means for converting each of the control signals into an actuation signal for at least one of the rams.

11. The apparatus of claim 8, wherein each ram comprises a hydraulic ram.

12. The apparatus of claim 1, further comprising means for preventing movement of the drum in a direction opposite the first direction.

13. The apparatus of claim 12, wherein the movement preventing means comprises a plurality of spaced-apart ratchet stops, each ratchet stop having a proximal end secured to the base and a distal end, the distal end being engageable with the drive sprocket to provide counter-force in the first direction if the drum tends to rotate in the direction opposite the first direction.

14. An apparatus for rotating a drum having an axis and an outside surface and rotatably mounted on a base, comprising:
    a. a plurality of sprockets evenly spaced apart along the entire length of the drum, each sprocket disposed about the outside surface of the drum, each sprocket comprising:
       i. a first flange circumferentially disposed about and coupled to the outside surface of the drum;
       ii. a second flange, circumferentially disposed about and coupled to the outside surface of the drum, spaced apart from and parallel to the first flange; and
       iii. a plurality of pins interconnecting the first flange and the second flange, spaced-apart about the drum, the pins being disposed parallel to the axis of the drum;
    b. a plurality of rams, each ram capable of exerting force on a selected one of the sprockets so as to cause rotation of the drum about the axis in a first direction, each ram being moveable between a linearly retracted first state and a linearly extended second state, each ram also having a first end and an opposite second end, the first end being secured to the base, the second end being engageable with the pins of the drive sprocket so that as the ram extends from the first state to the second state each ram exerts force on a pin in the first direction, the first direction being tangential to the outside surface and perpendicular to the axis of the drum, force from each ram being transferred to the drum through the pins, the first flange and the second flange, the force being distributed to the drum evenly along the length of the drum at each of the
    c. a plurality of ratchet stops, each preventing movement of the drum in a direction opposite the first direction, each ratchet stop having a proximal end secured to the base and a distal end, the distal end being engageable with a pin of a selected one of the drive sprockets to provide counter-force to the pin in the first direction if the drum tends to rotate in the direction opposite the first direction.

15. An apparatus for rotating a drum having an axis and an outside surface and rotatably mounted on a base, comprising:

a. a plurality of drive sprockets disposed about the outside surface of the drum and spaced-apart along the entire length of the drum, each drive sprocket comprising:
   i. a first flange circumferentially disposed about and coupled to the outside surface of the drum;
   ii. a second flange, circumferentially disposed about and coupled to the outside surface of the drum, spaced apart from and parallel to the first flange; and
   iii. a plurality of pins interconnecting the first flange and the second flange, spaced-apart about the drum, the pins being disposed parallel to the axis of the drum;
b. a plurality of spaced-apart hydraulic rams, each ram capable of exerting force on one of the drive sprockets so as to cause rotation of the drum about the axis in a first direction, each ram being moveable between a linearly retracted first state and a linearly extended second state, each ram also having a first end and an opposite second end, the first end being secured to the base, the second end being engaged withthe pins of a selected drive sprocket to that as the ram extends from the first state to the second state the ram exerts force on a pin in the first direction, force from the ram being transferred to the drum through the pin, the first flange and the second flange;
c. a programmable logic device that controls the hydraulic rams so as to apply force to each drive sprocket in a predetermined manner; and
d. a plurality of spaced-apart ratchet stops that prevent movement of the drum in a direction opposite the first direction, each ratchet stop having a proximal end secured to the base and a distal end, the distal end being engageable with a pin of the drive sprocket to provide counter-force to the pin in the first direction if the drum tends to rotate in the direction opposite the first direction, so that torque applied to the drum by the rams is distributed along the length of the drum at each of the plurality of drive sprockets.

16. A method of rotating a drum having an axis and an outside surface and rotatably mounted on a base, comprising the steps of:
   a. exerting rotational force on the outer surface of the drum at a plurality of locations evenly spaced-apart at predetermined intervals along the entire length of the drum so as to rotate the drum about the axis in a first direction while distributing torque applied to the drum along the length of the drum at a plurality preselected locations; and
   b. preventing movement of the drum in a direction opposite the first direction.

17. The method of claim 16, wherein the rotational force exerting step comprises extending a plurality of rams, each ram spaced apart along the length of the drum and secured to the base, against a plurality of drive sprockets, each drive sprocket spaced apart along and affixed to the drum and corresponding in position to one of the plurality of rams, thereby transferring rotational force from the rams to the drum.

* * * * *